US010149165B2

(12) United States Patent
Hamdi et al.

(10) Patent No.: US 10,149,165 B2
(45) Date of Patent: Dec. 4, 2018

(54) VIRTUAL WIRELESS NETWORKING

(71) Applicant: Dell Products L.P., Round Rock, TX (US)

(72) Inventors: Rabah S. Hamdi, Spring, TX (US); Saikrishna M. Kotha, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 332 days.

(21) Appl. No.: 14/918,253

(22) Filed: Oct. 20, 2015

(65) Prior Publication Data

US 2016/0044513 A1   Feb. 11, 2016

Related U.S. Application Data

(63) Continuation of application No. 13/670,845, filed on Nov. 7, 2012, now Pat. No. 9,179,330.

(51) Int. Cl.
| | |
|---|---|
| *H04W 12/08* | (2009.01) |
| *H04W 88/08* | (2009.01) |
| *H04W 24/02* | (2009.01) |
| *H04L 29/06* | (2006.01) |
| *H04W 88/12* | (2009.01) |
| *H04W 80/04* | (2009.01) |

(Continued)

(52) U.S. Cl.
CPC .......... *H04W 12/08* (2013.01); *H04L 63/105* (2013.01); *H04W 24/02* (2013.01); *H04W 88/08* (2013.01); *H04W 88/12* (2013.01); *H04W 8/26* (2013.01); *H04W 80/04* (2013.01); *H04W 88/06* (2013.01)

(58) Field of Classification Search
None
See application file for complete search history.

(56) References Cited

U.S. PATENT DOCUMENTS 7,756,126 B2   7/2010   Iyer et al.
8,131,997 B2   3/2012   Chang et al.
(Continued)

OTHER PUBLICATIONS

Aljabari et al., "Virutalization of Wireless LAN Infrastructures", Sep. 2011, IEEE, The 6th IEEE International Conference on Intelligent Data Acquisition and Advanced Computing Systems: Technology and Applications,pp. 837-841.

(Continued)

*Primary Examiner* — Mounir Moutaouakil
(74) *Attorney, Agent, or Firm* — Haynes and Boone, LLP (57) ABSTRACT

An access controller is coupled to a plurality of physical access points. The access controller is operable to create a plurality of virtual access controllers that are each coupled to the plurality of physical access points. The access controller then creates a different virtual access point for each of the plurality of virtual access controllers, and associates the virtual access point of each virtual access controller with each of the plurality of physical access points coupled to that virtual access controller. The access controller then provides a plurality of different wireless subnetworks through each of the plurality of physical access points, with each virtual access controller providing one of the different wireless subnetworks using the virtual access point associated with each of the plurality of physical access points coupled to that virtual access controller.

20 Claims, 6 Drawing Sheets

(51) Int. Cl.
    *H04W 88/06* (2009.01)
    *H04W 8/26* (2009.01)

(56) References Cited

U.S. PATENT DOCUMENTS

| | | | |
|---|---|---|---|
| 8,693,372 B2* | 4/2014 | Corson | H04L 45/02 |
| | | | 370/255 |
| 8,893,258 B2 | 11/2014 | Rao et al. | |
| 2006/0046730 A1 | 3/2006 | Briancon et al. | |
| 2007/0189308 A1 | 8/2007 | Tchigevsky et al. | |
| 2009/0007099 A1 | 1/2009 | Cummings et al. | |
| 2010/0131660 A1* | 5/2010 | Dec | H04L 41/0806 |
| | | | 709/228 |
| 2010/0189107 A1* | 7/2010 | Corson | H04L 45/02 |
| | | | 370/392 |
| 2011/0035494 A1 | 2/2011 | Pandey et al. | |
| 2012/0069801 A1* | 3/2012 | Das | H04W 84/045 |
| | | | 370/329 |
| 2013/0212279 A1* | 8/2013 | Dutta | G06F 9/5061 |
| | | | 709/226 |
| 2014/0126466 A1 | 5/2014 | Hamdi et al. | |

OTHER PUBLICATIONS

Braham et al., "Virtual Wireless Network Urbanization", Nov. 2011, IEEE, 2011 International Conference of the Future (http://ieeexplore.ieee.org/xpls/icp.jsp?arnumber=6126678).
Greaves, "VMware NIC Trunking Design", Aug. 2010, (http://www/simongreaves.eo.uk/vmware-nic-trunking).

* cited by examiner

FIG. 6

VIRTUAL WIRELESS NETWORKING

CROSS-REFERENCE TO RELATED APPLICATIONS

This is a Continuation application to U.S. Utility application Ser. No. 13/670,845 filed Nov. 7, 2012, entitled "VIRTUAL WIRELESS NETWORKING," the disclosure of which is incorporated herein by reference in their entirety.

BACKGROUND

The present disclosure relates generally to information handling systems, and more particularly to a virtual wireless network provided by information handling systems using virtual access controllers and virtual access points.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used with wireless networks such as, for example wireless Local Area Networks (LANs), in order to connect with each other and the Internet. In a typical wireless LAN deployments, a router is connected to the Internet, a wireless access controller is connected to the router, and one or more wireless access points may be connected to the wireless access controller directly or through a switch. The wireless access points connect to the wireless access controller within the same layer 2 segment in order to provide for centralized management of the wireless network via a single management entity (the wireless access controller). IHSs may then connect to each other and the Internet by connecting to one of the wireless access points. The wireless access controller may support the industry standard Control and Provisioning of Wireless Access Points Protocol (CAPWAP), which defines the interface between the wireless access controller and the wireless access points in order to simplify wireless LAN provisioning and management.

Some wireless access points are operable to support multiple wireless LANs that can segregate user groups or applications into different subnetworks, but that type of wireless access point functionality requires increased design and management complexity in the wireless access point, which increases the cost of the wireless access point and complicates its use.

Conventionally, physical wireless access controllers manage multiple physical wireless access points such that as the number of physical access points increase, the design complexity and management becomes cumbersome.

Accordingly, it would be desirable to provide an improved networking system.

SUMMARY

According to one embodiment, an information handling system (IHS) networked system includes a first physical access point and a second physical access point that are each operable to communicate with an IHS, an access controller coupled to each of the first physical access point and the second physical access point and to an Internet Protocol (IP) network, wherein the access controller is operable to: create a first virtual access controller and couple the first virtual access controller to each of the first physical access point and the second physical access point; create a second virtual access controller and couple the second virtual access controller to each of the first physical access point and the second physical access point; create a first virtual access point and associate the first virtual access point with the first virtual access controller and each of the first physical access point and the second physical access point; create a second virtual access point and associate the second virtual access point with the second virtual access controller and each of the first physical access point and the second physical access point; provide a first wireless subnetwork through each of the first physical access point and the second physical access point using the first virtual access point associated with the first virtual access controller; and provide a second wireless subnetwork through each of the first physical access point and the second physical access point using the second virtual access point associated with the second virtual access controller.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
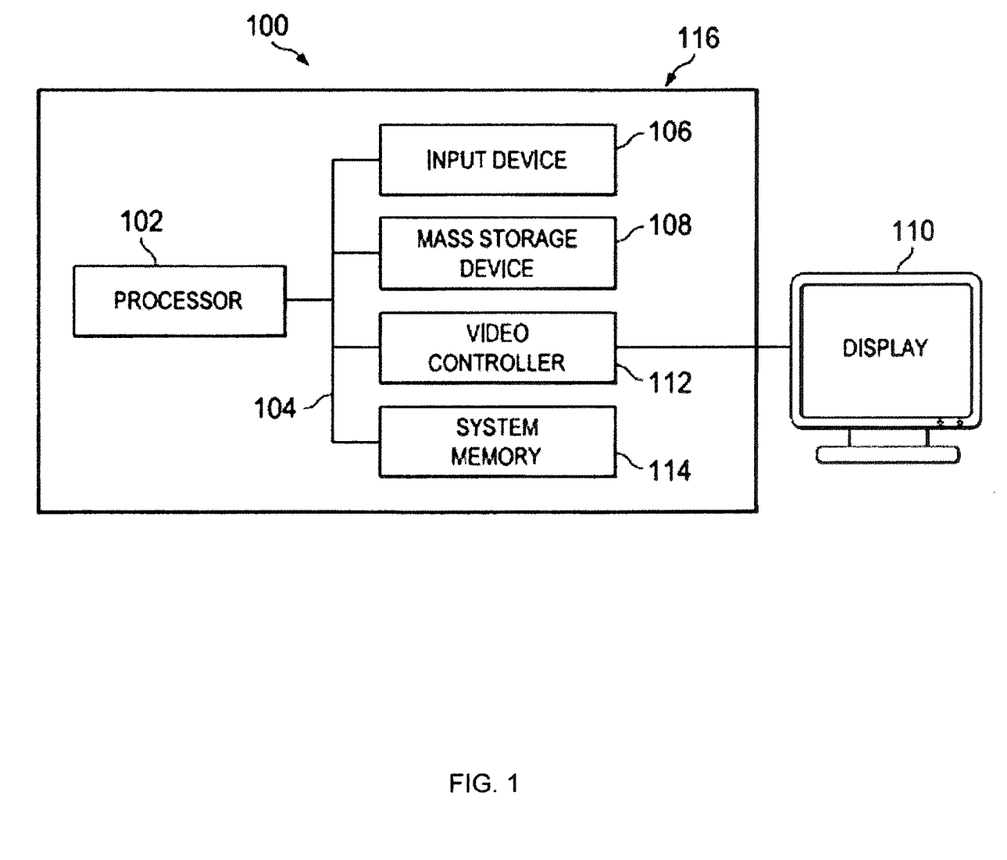
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
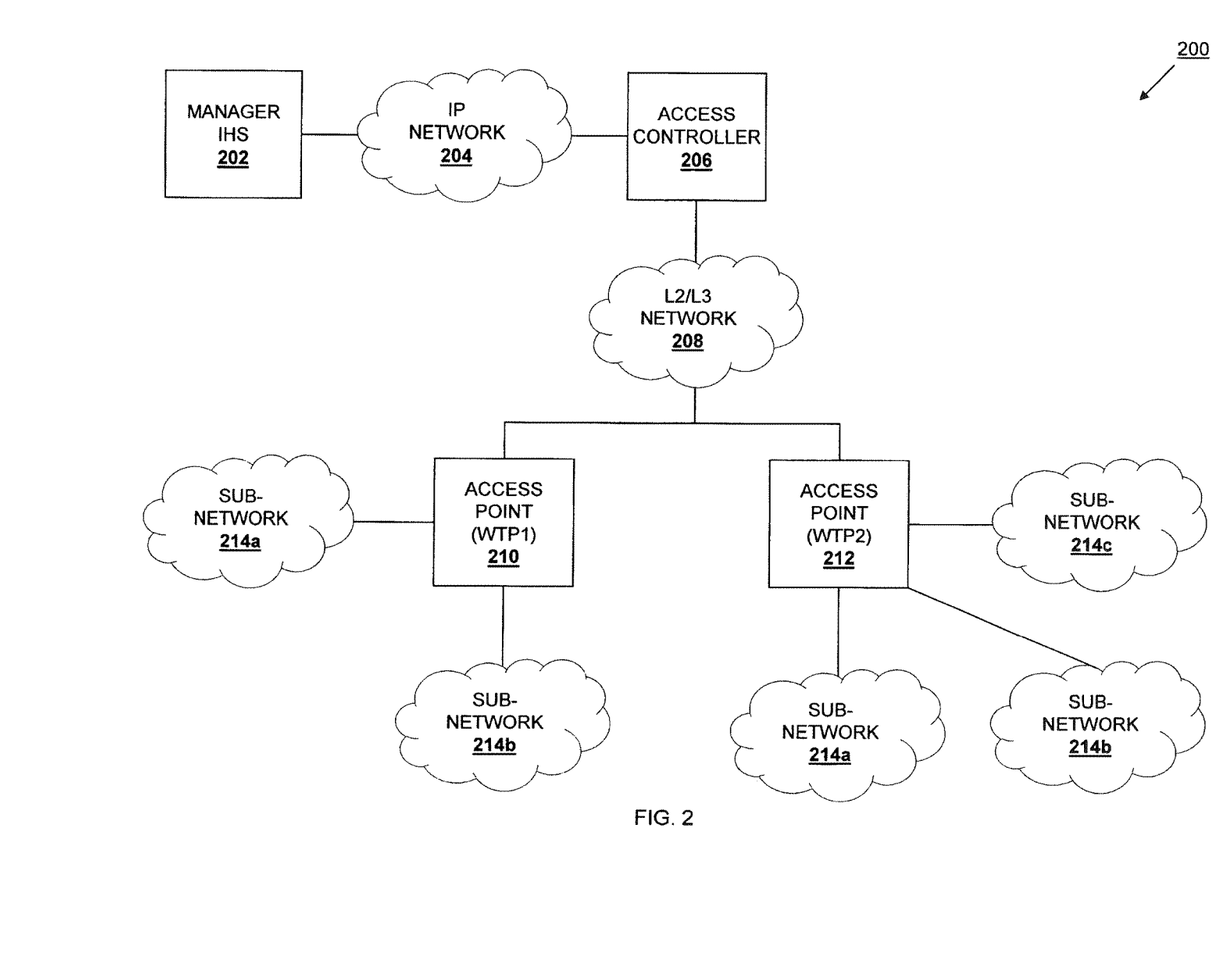
FIG. 2 is a schematic view illustrating an embodiment of a networked system.

Referring now to FIG. 2, an embodiment of a networked system 200 is illustrated. The networked system 200 includes a manager IHS 202 that is coupled to an Internet Protocol (IP) network 204. In an embodiment, the manager IHS 202 may be a wireless manager server that is operable to configure virtual access controllers, virtual access points, physical access controllers, physical access points, subnetworks, and subnetworks profiles, as well as communicate with a server (e.g., an accounting, authentication, and authorization (AAA) server) that may include, for example, user and device credentials. While not illustrated, a plurality of other IHSs known in the art may be coupled to the IP network 204. An access controller 206 is coupled to the IP network 204 and a Layer 2/Layer 3 (L2/L3) network 208. A plurality of access points 210 and 212 are coupled to the L2/L3 network 208, with the access point 210 providing a plurality of subnetworks 214a and 214b, and the access point 212 providing the plurality of subnetworks 214a and 214b, along with a subnetwork 214c. The creation and management of the subnetworks 214a, 214b, and 214c is discussed in further detail below. In an embodiment, the access controller 206 is a physical access controller IHS and the access points 210 and 212 are physical access point IHSs. The access controller 206 may include a processor (similar to the processor 102 discussed above with reference to FIG. 1) and a memory (similar to the system memory 114 and/or mass storage device 108 discussed above with reference to FIG. 1) that is coupled to the processor and that includes instructions that, when executed by the processor, cause the processor to perform the functions of the access controller 206 as discussed below. While only two access points 210 and 212 are illustrated, any number of access points may be used in the networked system 200 while remaining within the scope of the present disclosure.

Figure 3:
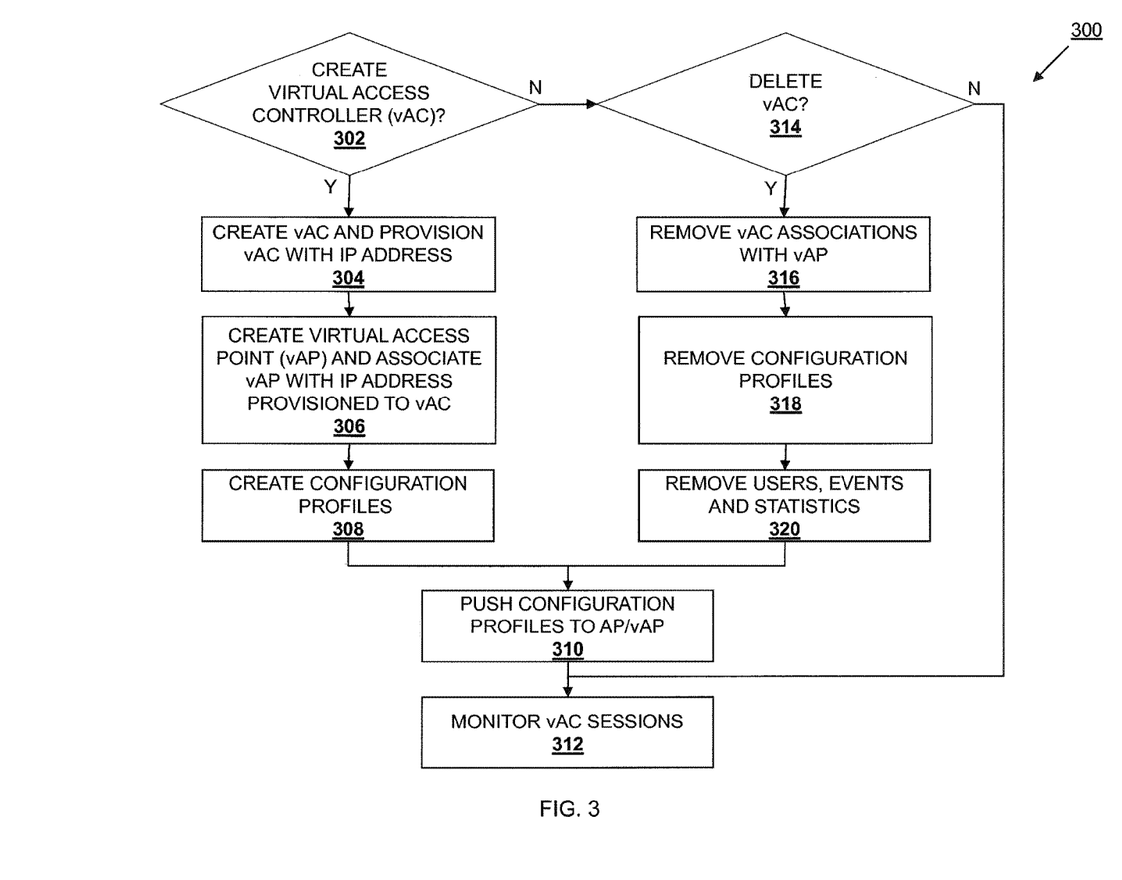
FIG. 3 is a flow chart illustrating an embodiment of a method for providing a virtual wireless network.

Referring now to FIGS. 2 and 3, an embodiment of a method 300 for providing an IHS network is illustrated. As described below, the method 300 may be performed to create plurality of virtual access controllers coupled to each of the access points 210 and 212, and create a virtual access point for each virtual access controller that is managed by its respective virtual access controller across each of the access points 210 and 212, thus allowing each virtual access controller to manage a subnetwork across the different access points 210 and 212. The method 300 begins at decision block 302 where it is determined whether a virtual access controller should be created. In an embodiment, a network administrator may determine whether to create a virtual access controller based on network configuration needs. In the example below, an employee subnetwork, an administrator subnetwork, and a guest subnetwork are needed, and a network administrator may determine that three virtual access controllers should be created and managed using the access controller 206. In another example, a network administrator may group multiple physical and virtual access points available in a network to be managed by a single virtual access controller. As discussed below, the method 300 may be performed using the access controller 206 for each virtual access controller/subnetwork needed in the networked system 200. If, at decision block 302, it is determined that a virtual access controller should be created, the method 300 proceeds to block 304 where a virtual access controller is created and provisioned with an IP address. In an embodiment, the network administrator may allocate the hardware resources in the access controller 206 to a virtual access controller and then assign that virtual access controller an IP address so that it can be reached through the network.

The method 300 then proceeds to block 306 where a virtual access point is created and associated with the IP address provisioned to the virtual access controller in block 304. In an embodiment, the network administrator may allocate the hardware resources in the access controller 206 to a virtual access point and then associate that virtual access point with the IP address provisioned to the virtual access controller in block 304. The method 300 then proceeds to block 308 where configuration profiles are created. In an embodiment the network administrator may create the configuration profiles at block 308 based on the needs of the subnetwork. In an embodiment, a configuration profile may include a subnetwork type and service set identifier (SSID). For example, subnetwork types and SSIDs may include an employee subnetwork type and associated SSID, an administrator subnetwork type and associated SSID, and a guest subnetwork type and associated SSID, as discussed in the example below. A configuration profile indicating subnetwork properties may be associated with configuration subprofiles for a physical access points (e.g., the access points 210 and/or 212) and the virtual access point created in block 306 of the method 300. Configuration subprofiles may include, for example, network access subprofiles, security subprofiles, encryption subprofiles, virtual local area networks (VLANs), a maximum number of wireless clients allowed, radio resource subprofiles, and/or a variety of other configuration information known in the art. As such, the access controller 206 and/or the virtual access controller created at block 304 of the method 300 may maintain configuration information for each associated access point such as, for example, a basic SSID (BSSID), an extended SSID (ESSID), virtual area networks (VLANs), access information, security information, configuration profiles, VLAN configuration information, a maximum number of wireless clients, an associated number of wireless clients, and/or a variety of other configuration information known in the art.

The method 300 then proceeds to block 310 where the configuration profiles are used to configure and set up the access points and virtual access point. In an embodiment, the network administrator may use the access controller 206 to push the configuration profiles created in block 308 of the method 300 to the access points 210 and 212 and the virtual access point created at block 306 of the method 300. The method 300 then proceeds to block 312 where the virtual access controller sessions are monitored. In an embodiment, at block 312, the access controller 206 monitors any virtual access controllers created per block 304 and their operations associated with their associated subnetwork provided using the virtual access point created at block 306 and available on the access points 210 and/or 212.

If, at decision block 302, the network administrator determines that a virtual access controller should not be created, the method 300 proceeds to decision block 314 where it is determined whether a virtual access controller should be deleted. In an embodiment, the network administrator may determine a virtual access controller should be deleted due to a desire to delete or change a subnetwork, due to a reorganization of the network, etc. If, at decision block 314, it is determined that a virtual access controller should not be deleted, the method proceeds to block 312 where virtual access controller sessions are monitored as discussed above. If, at decision block 314, it is determined that a virtual access controller should be deleted, the method 300 proceeds to block 316 where the associations between the virtual access controller and its virtual access point are removed. In an embodiment, the access controller 206 is operable to disassociate a virtual access controller and a virtual access point that were associated with each other substantially as discussed above with reference to block 306 of the method 300. The method 300 then proceeds to block 318 where configuration profiles are removed. In an embodiment, the access controller 206 is operable to remove any configuration profiles pushed to the access points 210 and 212 and/or the virtual access points substantially as discussed above with reference to block 310 of the method 300. The method 300 then proceeds to block 320 where users, events, and statistics are removed. In an embodiment, at block 320, the access point 206 is operable to remove users, events, and statistics that were associated with the virtual access points and/or generated during the use of subnetwork provided by the virtual access controller to be deleted. The method 300 then proceeds to block 310 where configuration profiles are pushed to the access points and virtual access points, and block 312 where virtual access controllers sessions are monitored as discussed above. In an embodiment, some subset of the configuration profiles pushed to the access points may be removed from the access points based on the new required configurations, which may be followed by new configurations information for a new virtual access controller (if created).

Thus, the access controller 206 is operable to virtualize one or more wireless networks by creating first logical entities, referred to herein as virtual access controllers, and creating and managing second logical entities, referred to herein as virtual access points, within the domain of the virtual access controllers. One of skill in the art will recognize that the access controller 206 may be provided to enhance the CAPWAP standard protocol and reduce wireless network procurement and operational costs. Furthermore, centralizing the Media Access Control (MAC) layer in the access controller 206 and removing its complexity from the access points 210 and 212 reduces the complexity of the access points 210 and 212 (e.g., the access points 210 and 212 may only need intelligent antenna systems for transferring user data) and reduces the operational cost (e.g., due to a reduced maintenance required for the intelligent antennas.) Thus, a "smart" physical access controller may be provided that can be used to virtualize multiple access controllers and access points (i.e., within that physical access controller) and communicate with physical access points to create and manage multiple subnetworks that are available via each physical access point.

Figure 4:
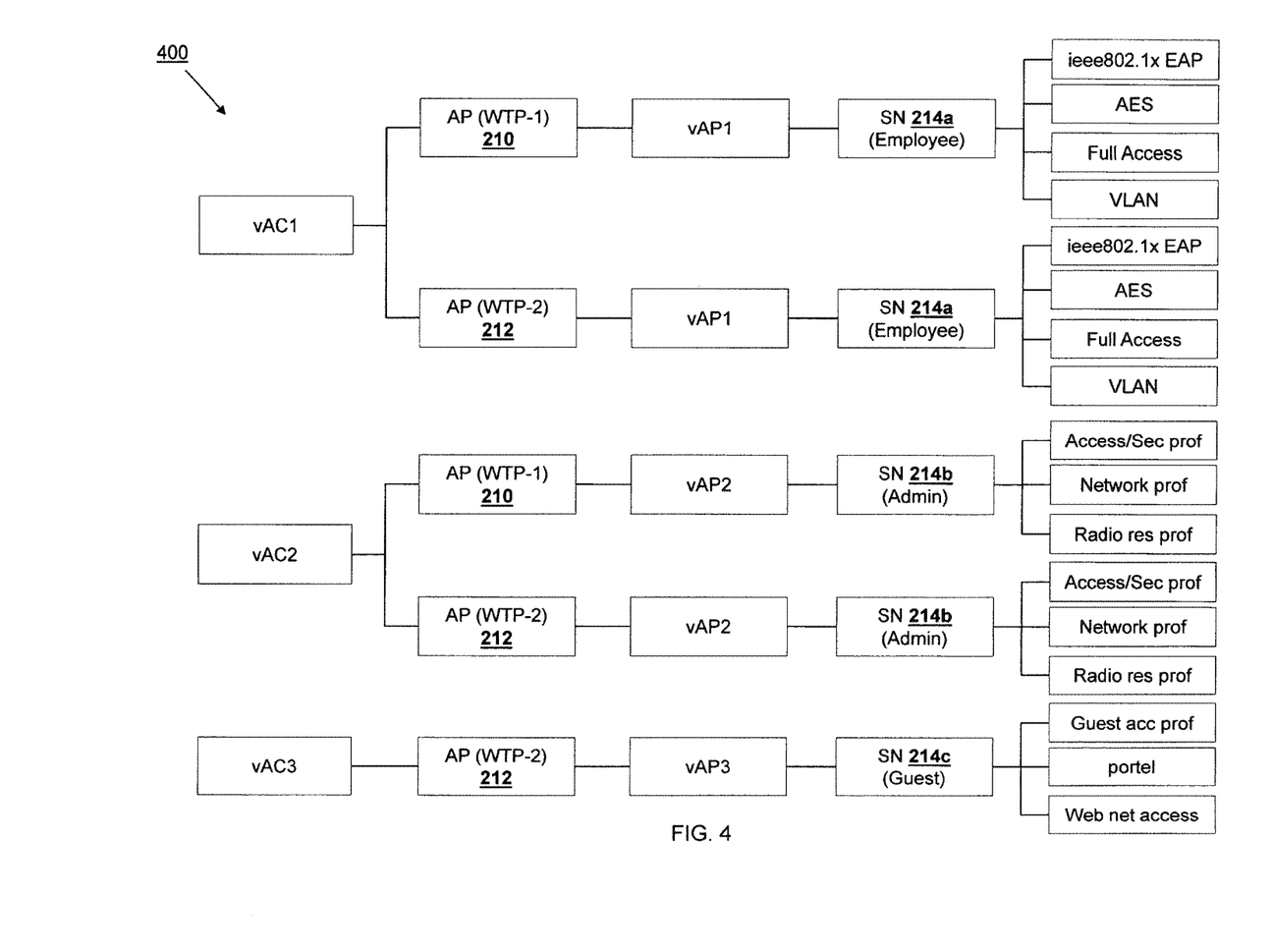
FIG. 4 is a schematic view illustrating an embodiment of a mapping of the provisioning of a plurality of different subnetwork in a virtual wireless network.

Referring now to FIGS. 2, 3, and 4, an embodiment of a mapping 400 of the provisioning of a plurality of different subnetworks in a virtual wireless network using virtual access controllers, access points 210 and 212, virtual access points, subnetwork types, and configuration profile information. The mapping 400 provides an example of a virtual wireless network created using the access controller 206 in performing the method 300 a plurality of times. As can be seen, a first virtual access controller vAC1 has been created and provisioned with an IP address at block 304 of the method 300, a first virtual access point vAP1 has been created and associated with the IP address provisioned to first virtual access controller vAC1, and the first virtual access controller vAC1 has been associated with each of the access points 210 and 212 such that the first virtual access point vAP1 is also associated with each of the access points 210 and 212. Furthermore, configuration profiles were pushed to the first virtual access point vAP1 and the access points 210 and 212 such that the subnetwork 214a (an Employee subnetwork in the illustrated embodiment) was associated with the first virtual access point vAP1 and the access points 210 and 212 through the first virtual access points vAP1, with each subnetwork 214a including configuration profile information that includes ieee802.1x extensible authentication protocol (EAP) information, Advanced Encryption Standard (AES) information, Full Access information, and VLAN information.

Similarly, a second virtual access controller vAC2 has been created and provisioned with an IP address at block 304 of the method 300, a second virtual access point vAP2 has been created and associated with the IP address provisioned to second virtual access controller vAC2, and the second virtual access controller vAC2 has been associated with each of the access points 210 and 212 such that the second virtual access point vAP2 is also associated with each of the access points 210 and 212. Furthermore, configuration profiles were pushed to the second virtual access point vAP2 and the access points 210 and 212 such that the subnetwork 214b (an Administrator subnetwork in the illustrated embodiment) was associated with the second virtual access point vAP2 and the access points 210 and 212 through the second virtual access point vAP2, with each subnetwork 214b including configuration profile information that includes an Access/Security profile, a Network profile, and a Radio Resource Profile.

Furthermore, a third virtual access controller vAC3 has been created and provisioned with an IP address at block 304 of the method 300, a third virtual access point vAP3 has been created and associated with the IP address provisioned to third virtual access controller vAC3, and the third virtual access controller vAC3 has been associated with the access point 212 such that the third virtual access point vAP3 is also associated with the access point 212. Furthermore, configuration profiles were pushed to the third virtual access point vAP3 and the access point 212 such that the subnetwork 214c (a Guest subnetwork in the illustrated embodiment) was associated with the third virtual access point vAP3 and the access point 212 through the third virtual access point vAP3, with the subnetwork 214c including configuration profile information that includes an Guest Access profile, a portal, and a Web network access.

Thus, as can be seen from FIGS. 2 and 4, the access controller 206 creates a virtual access controller (e.g., vAC1, vAC2, and vAC3) for each different subnetwork that is to be provided using each of the access points (e.g., access points 210 and 212). A virtual access point (e.g., vAP1, vAP2, and vAP3) is associated with each respective virtual access controller (e.g., vAP1 is associated with vAC1, vAP2 is associated with vAC2, vAP3 is associated with vAC3) as well as each access point that is to broadcast its virtual access controller's subnetwork (e.g., vAP1 is associated with access points 210 and 212 to broadcast subnetwork 214a using both access points 210 and 212, vAP2 is associated with access points 210 and 212 to broadcast subnetwork 214b using both access points 210 and 212, and vAP3 is associated with access point 212 to broadcast subnetwork 214c using access point 212.) In an embodiment, the access controller 206 provides each virtual access controller a unique IP address for each subnetwork (e.g., a virtual LAN) that is associated with a BSSID of a virtual access point that is accessible on each of the access points 210 and 212. In an embodiment, the vAC and other configuration information may be provided as object elements that may be defined within the CAPWAP control plane messaging exchanges, with each access point in the same network segment within the domain of the access controller 206 or virtual access controllers.

While a specific example of a mapping 400 of the provisioning of the plurality of subnetworks using virtual access controllers, (physical) access points, virtual access points, subnetwork types, and configuration profile information is illustrated that provides an examples of a virtual wireless network created by a (physical) access controller operating according to the method of the present disclosure, one of skill in the art will recognize that a variety of configurations including virtual access controllers and virtual access points provided by one or more physical or virtual access controllers coupled to one or more physical access points to broadcast multiple subnetworks using the one or more physical access points will fall within the scope of the present disclosure.

In operation, the access controller 206 of FIG. 2 may direct network traffic according to the virtual wireless network mapping 400 of FIG. 4. For example, as discussed above, each of the virtual access controllers vAC1, vAC2, and vAC3 is provided a particular IP address, while each virtual access point vAP1, vAP2, and vAP3 are associated with the IP address of their virtual access controller. One of skill in the art will recognize how the network will operate to provide the subnetworks using the IP addresses and SSIDs described above.

Figure 5:
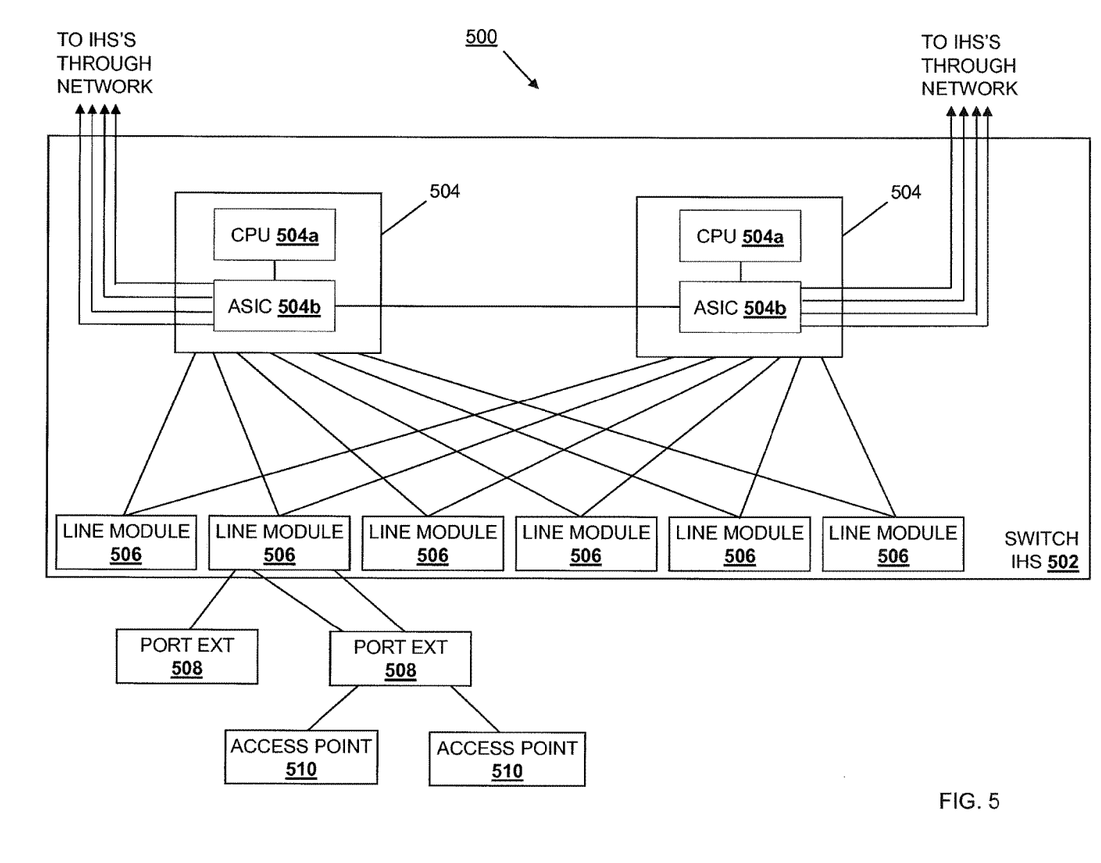
FIG. 5 is a schematic view illustrating an embodiment of a switch.

Referring now to FIG. 5, an embodiment of a switch system 500 is illustrated that may provide the access controller 206 discussed above. The embodiment of the switch system illustrated in FIG. 5 is an example of a centralized network switching system including optimized switching fabric port extenders. However, the example illustrated in FIG. 5 is simply one example of the provision of a network controller that provides an access controller according to the teachings of the present disclosure, and one of skill in the art will recognize that the teachings below may be applied to a variety of different devices and systems without departing from the scope of the present disclosure. The switch system 500 includes a switch IHS 502 having a plurality of switching logic devices 504 each including a processor 504a coupled to an application specific integrated circuit (ASIC) 504b. Each ASIC 504b is connected to each other and to a plurality of line modules 506. As illustrated for one of the line modules 506, any of the line modules 506 may be connected to a plurality of port extenders 508. As illustrated for one of the port extenders 508, any of the port extenders 508 may be coupled to a plurality of access points 510. As would be understood by one of skill in the art, the switch IHS 502 may be connected to a core switch or router (not illustrated) that is further connected the Internet, a datacenter, etc.

Figure 6:
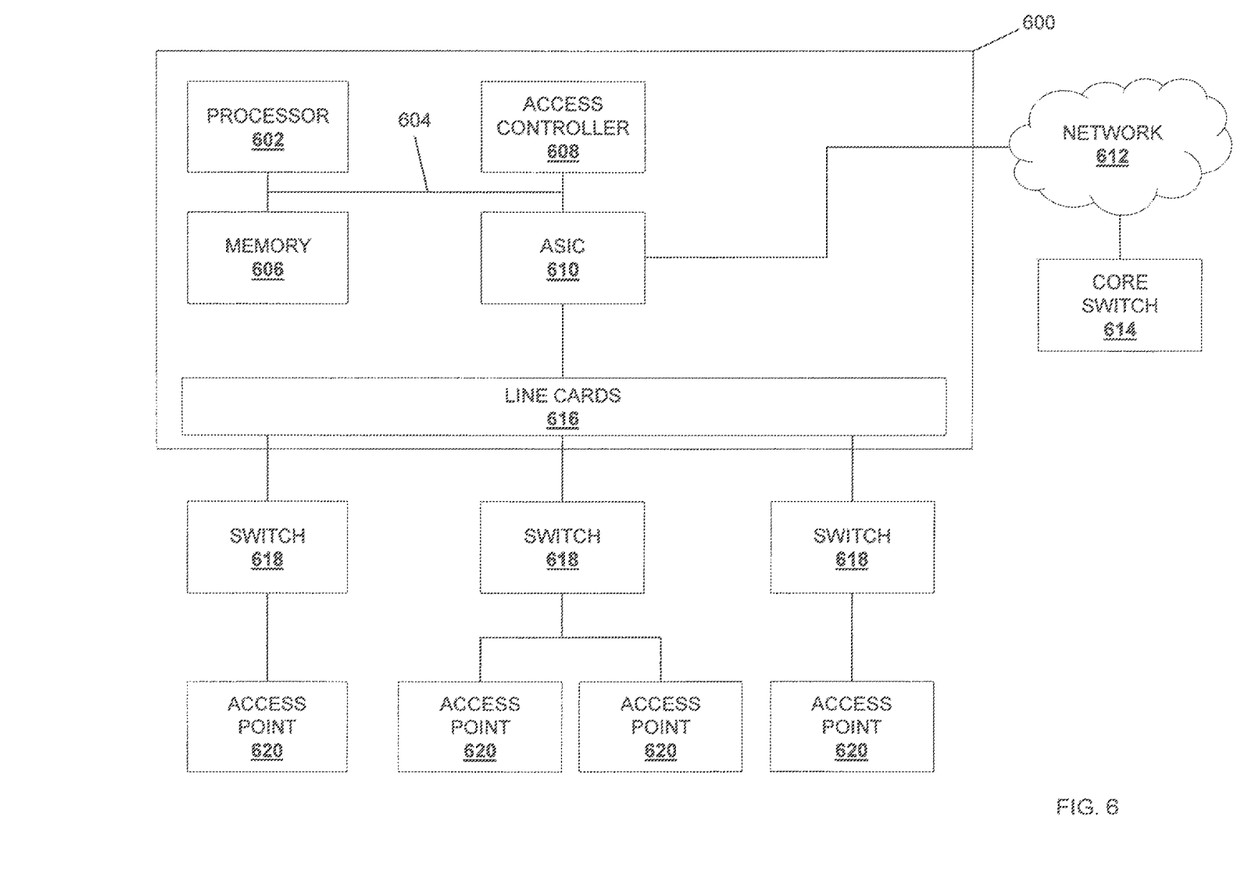
FIG. 6 is a schematic view illustrating an embodiment of a switching logic device.

Referring now to FIG. 6, a switching logic device 600, which may be the switching logic device 504 discussed above with reference to FIG. 5, is illustrated. The switching logic device 600 includes a processor 602 coupled through a control bus 604 to a memory 606 such as, for example, a double data rate (DDR) memory device. An access controller 608 such as, for example, a CAPWAP access controller, is coupled to the processor 602 and memory 606 through the control bus 604. An ASIC 610 is coupled to the processor 602, the memory 606, and the access controller 608 through the control bus 604. The ASIC 610 is also coupled through a network 612 to a core switch 614. The ASIC 610 is also coupled to a plurality of line cards 616, and the plurality of line cards 616 couple the switching logic device 600 to a plurality of switch 618. Each switch 618 couples to one or more access points 620.

The virtual wireless networking system and method of the present disclosure provides a number of advantages for networking solutions and enterprise data center networks by offering a unique and flexible solution that addresses virtualization of wireless networks, providing real-time flexibility and programmable configurations using industry standard protocols, reducing wireless network procurement and operational costs, providing a standard method for feature enablement with streamlined configuration and management of virtualized wireless access points, and is applicable across multiple networking layers and deployment environments (e.g., CBM and DCN networking solutions) such that the system and method has longevity and is reusable. One of skill in the art will recognize that these and other benefits can result from an IHS network created and managed according to the teachings of the present disclosure, including the ability of a user to roam between multiple physical access points that share access, policy, and security information through the virtual access points provided on the physical access controller that is coupled to those physical access points, while providing quicker authentication during such roaming that is performed in the access controller rather than the access point.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A wireless network access system, comprising:
 a plurality of physical access points that are each configured to provide wireless access to one or more subnetworks; and an access controller that is coupled to the plurality of physical access points and that is configured to:
  create a first virtual access controller for a first subnetwork and a second virtual access controller for a second subnetwork that is different than the first subnetwork, wherein the first virtual access controller and the second virtual access controller are coupled to the plurality of physical access points;
  create a first virtual access point for the first virtual access controller and a second virtual access point for the second virtual access controller;
  push first configuration information to the first virtual access point and second configuration information to the second virtual access point; and
  control wireless access to the first subnetwork through the plurality of physical access points based on the first configuration information that was pushed to the first virtual access point, and control wireless access to the second subnetwork through the plurality of physical access points based on the second configuration information that was pushed to the second virtual access point, wherein the first configuration information allows a first user device to roam between at least two of the plurality of physical access points using the first virtual access point, and wherein the second configuration information allows a second user device to roam between at least two of the plurality of access points using the second virtual access point.

2. The virtual wireless network access system of claim 1, wherein the first configuration information includes network access information for the first subnetwork, and wherein the second configuration information includes network access information for the second subnetwork.

3. The virtual wireless network access system of claim 1, wherein the first configuration information includes security information for the first subnetwork, and wherein the second configuration information includes security information for the second subnetwork.

4. The virtual wireless network access system of claim 1, wherein the first configuration information includes encryption information for the first subnetwork, and wherein the second configuration information includes encryption information for the second subnetwork.

5. The virtual wireless network access system of claim 1, wherein the first configuration information includes virtual local area network (VLAN) information for the first subnetwork, and wherein the second configuration information includes VLAN information for the second subnetwork.

6. The virtual wireless network access system of claim 1, wherein the first configuration information includes maximum client allowed information for the first subnetwork, and wherein the second configuration information includes maximum client allowed information for the second subnetwork.

7. The virtual wireless network access system of claim 1, wherein the first configuration information includes radio resource information for the first subnetwork, and wherein the second configuration information includes radio resource information for the second subnetwork.

8. An information handling system (IHS), comprising:
a network communication subsystem;
a processing system coupled to the network communication subsystem;
a memory system coupled to the processing system and including instruction that, when executed by the processing system, cause the processing system to perform operations comprising:
  creating a first virtual access controller for a first subnetwork and a second virtual access controller for a second subnetwork that is different than the first subnetwork;
  creating a first virtual access point for the first virtual access controller and a second virtual access point for the second virtual access controller;
  providing first configuration information to the first virtual access point and second configuration information to the second virtual access point;
  controlling access to the first subnetwork through a plurality of physical access points that are in communication with the first virtual access controller through the network communication subsystem, wherein access to the first subnetwork is controlled at least in part using the first configuration information that was pushed to the first virtual access point; and
  controlling access to the second subnetwork through the plurality of physical access points that are in communication with the second virtual access controller through the network communication subsystem, wherein access to the second subnetwork is controlled at least in part using the second configuration information that was pushed to the second virtual access point, wherein the first configuration information allows a first user device to roam between at least two of the plurality of physical access points using the first virtual access point, and wherein the second configuration information allows a second user device to roam between at least two of the plurality of access points using the second virtual access point.

9. The IHS of claim 8, wherein the first configuration information includes network access information for the first subnetwork, and wherein the second configuration information includes network access information for the second subnetwork.

10. The IHS of claim 8, wherein the first configuration information includes security information for the first subnetwork, and wherein the second configuration information includes security information for the second subnetwork.

11. The IHS of claim 8, wherein the first configuration information includes encryption information for the first subnetwork, and wherein the second configuration information includes encryption information for the second subnetwork.

12. The IHS of claim 8, wherein the first configuration information includes virtual local area network (VLAN) information for the first subnetwork, and wherein the second configuration information includes VLAN information for the second subnetwork.

13. The IHS of claim 8, wherein the first configuration information includes maximum client allowed information for the first subnetwork, and wherein the second configuration information includes maximum client allowed information for the second subnetwork.

14. The IHS of claim 8, wherein the first configuration information includes radio resource information for the first subnetwork, and wherein the second configuration information includes radio resource information for the second subnetwork.

15. A method for providing access to a wireless network, comprising:

associating, by an access controller, a first virtual access controller with a first subnetwork and a second virtual access controller with a second subnetwork that is different than the first subnetwork;

associating, by the access controller, a first virtual access point with the first virtual access controller and a second virtual access point with the second virtual access controller;

transmitting, by the access controller, first configuration information to the first virtual access point and second configuration information to the second virtual access point;

using, by the access controller, the first configuration information that was transmitted to the first virtual access point to control access to the first subnetwork through a plurality of physical access points that are coupled to the first virtual access controller; and using, by the access controller, the second configuration information that was transmitted to the second virtual access point to control access to the second subnetwork through the plurality of physical access points coupled to the second virtual access controller, wherein the first configuration information allows a first user device to roam between at least two of the plurality of physical access points using the first virtual access point, and wherein the second configuration information allows a second user device to roam between at least two of the plurality of access points using the second virtual access point.

16. The method of claim 15, wherein the first configuration information includes network access information for the first subnetwork, and wherein the second configuration information includes network access information for the second subnetwork.

17. The method of claim 15, wherein the first configuration information includes security information for the first subnetwork, and wherein the second configuration information includes security information for the second subnetwork.

18. The method of claim 15, wherein the first configuration information includes encryption information for the first subnetwork, and wherein the second configuration information includes encryption information for the second subnetwork.

19. The method of claim 15, wherein the first configuration information includes virtual local area network (VLAN) information for the first subnetwork, and wherein the second configuration information includes VLAN information for the second subnetwork.

20. The method of claim 15, wherein the first configuration information includes radio resource information for the first subnetwork, and wherein the second configuration information includes radio resource information for the second subnetwork.

* * * * *